US006810495B2

(12) United States Patent
Castelli et al.

(10) Patent No.: US 6,810,495 B2
(45) Date of Patent: Oct. 26, 2004

(54) METHOD AND SYSTEM FOR SOFTWARE REJUVENATION VIA FLEXIBLE RESOURCE EXHAUSTION PREDICTION

(75) Inventors: Vittorio Castelli, Croton-on-Hudson, NY (US); Richard E. Harper, Chapel Hill, NC (US); Philip Heidelberger, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 09/820,611

(22) Filed: Mar. 30, 2001

(65) Prior Publication Data

US 2002/0144178 A1 Oct. 3, 2002

(51) Int. Cl.[7] ................................................ G06F 11/00
(52) U.S. Cl. ........................................ 714/47; 714/38
(58) Field of Search ............................. 714/26, 38–39, 714/47; 706/916; 702/179, 181, 182, 186

(56) References Cited

U.S. PATENT DOCUMENTS

| | | | |
|---|---|---|---|
| 5,715,386 A | | 2/1998 | Fulton, III et al. |
| 5,748,882 A | | 5/1998 | Huang |
| 6,112,136 A | | 8/2000 | Paul et al. |
| 6,172,673 B1 | | 1/2001 | Lehtinen et al. |
| 6,182,249 B1 | * | 1/2001 | Wookey et al. ............... 714/47 |
| 6,363,332 B1 | * | 3/2002 | Rangarajan et al. ........ 702/185 |
| 6,374,368 B1 | * | 4/2002 | Mitchell et al. ............... 714/38 |
| 6,415,189 B1 | * | 7/2002 | Hajji ........................... 700/79 |
| 6,594,784 B1 | * | 7/2003 | Harper et al. .................. 714/47 |
| 6,598,184 B1 | * | 7/2003 | Merget et al. ................. 714/47 |
| 6,629,266 B1 | * | 9/2003 | Harper et al. .................. 714/38 |
| 2001/0042227 A1 | * | 11/2001 | Stephenson et al. .......... 714/47 |
| 2002/0087612 A1 | * | 7/2002 | Harper et al. ................ 709/100 |
| 2002/0087913 A1 | * | 7/2002 | Harper et al. .................. 714/15 |
| 2002/0144178 A1 | * | 10/2002 | Castelli et al. ................ 714/15 |
| 2003/0023719 A1 | * | 1/2003 | Castelli et al. .............. 709/224 |
| 2003/0037290 A1 | * | 2/2003 | Price et al. .................... 714/38 |
| 2003/0079154 A1 | * | 4/2003 | Park et al. ...................... 714/1 |

FOREIGN PATENT DOCUMENTS

EP 0701209 A2 * 3/1996 ............ G06F/11/14

OTHER PUBLICATIONS

Bao, Sun, Trivedi "Adaptive rejuvenation: Degradation Model Scheme" IEEE: Proceedings of the 2003 International Conferenc on Dependable Computing.*
Bobbio, Sereno "Fine Grained Software Rejuvenation Models" Date unknown.*

(List continued on next page.)

Primary Examiner—Scott Baderman
Assistant Examiner—Bryce P. Bonzo
(74) Attorney, Agent, or Firm—Gail H. Zarick, Esq.; McGinn & Gibb, PLLC (57) ABSTRACT

A method (and computer system in which at least one software component thereof is restarted based on projection of resource exhaustion), for selecting the most suitable projection method from among a class of projection methods, includes providing M fitting modules which take measured symptom data associated with the system as input and produce M scores, wherein M is an integer, selecting the fitting module producing the best score, and from the selected module, producing a prediction of the resource exhaustion time.

45 Claims, 7 Drawing Sheets

OTHER PUBLICATIONS

Li, Vaidyanathan, Trivedi "An Approach for Estimation of Software Aging in a Web Server" IEEE: Proceedings of the 2002 International Symposium on Emperical Software Engineering.*

Vaidyanathan, Kalyanaraman, et al., "A Measurement–Based Model for Estimation of Resource Exhaustion in Operational Software Systems", Nov. 1–4, 1999; International Symposium on Software Reliability Engineering 1999 Proceedings; pp. 84–93.

Garg, Sachin, et al., "Analysis of Software Rejuvenation Using Markov Regenerative Stochastic Petri Net", Oct. 24–27, 1995; International Symposium on Software Reliability Engineering, IEEE, 1995, Proceedings; pp. 180–187.

Wang, Yi–Min, et al., "Checkpointing and Its Applications", Jun. 27–30, 1995; Twenty–Fifth International Symposium on Fault–Tolerant Computing, 1995; FTCS–25 Digest Papers; pp. 22–31.

Tai, Ann T., et al., "On–Board Preventive Maintenance for Long–Life Deep Space Missions: A Model–Based Analysis", Sep. 7–9, 1998; IEEE International Computer Perfor mance and Dependability Symposium, 1998; IDPS '98 Proceedings; pp. 196–205.

Sachin Garg et al., "A Methodology for Detection and Estimation of Software Aging", Lucent Technologies, pp. 1–10.

N.R. Draper et al., "Applied Regression Analysis", Second Edition, John Wiley & Sons, Inc., pp. 294–343, with Preface.

Huang, Yennun, et al., "Software Rejuvenation: Analysis, Module and Applications", Jun. 27–30, 1995; Twenty–Fifth International Symposium on Fault–Tolerant Computing, IEEE, 1995; FTCS–25 Digest Papers; pp. 381–390.

Garg, Sachin, et al., "On the Analysis of Software Rejuvenation Policies", Jun. 16–19, 1997, 12th Annual Conference on Computer Assurance, IEEE, 1997; COMPASS '97 Are We Making Progress Towards Computer Assurance?; pp. 88–96.

* cited by examiner

METHOD AND SYSTEM FOR SOFTWARE REJUVENATION VIA FLEXIBLE RESOURCE EXHAUSTION PREDICTION

CROSS-REFERENCE TO RELATED APPLICATIONS

The present application is related to U.S. patent application No. 09/442,003 filed on Nov. 17, 1999 to Harper et al. entitled "Method and System for Transparent Time-Based Selective Software Rejuvenation" having IDM Docket No. YO999-424, assigned to the present assignee, and incorporated herein by reference.

The present application also is relation to U.S. patent application No. 09/442,001 filed on Nov. 17, 1999 to Harper et al. entitled "Method and System for Transparent System-Based Selective Software Rejuvenation" having IBM Docket No. YO99-449, assigned to the present assignee, and incorporated herein be reference.

BACKGROUND OF THE INVENTION

1. Field of the Invention

The present invention generally relates to a method and system for software rejuvenation, and more particularly to a method and system for transparent symptom-based selective software rejuvenation.

2. Description of the Related Art

Software failures are now known to be a dominant source of system outages. One common form of software failure is due to "software aging" in which a resource, such as memory usage, is increasingly consumed and which eventually causes the system to fail. Preventing such aging by restarting the system (or subsystem) is known as "software rejuvenation."

The background and related art pertaining to software rejuvenation is described in detail in the above-mentioned copending U.S. patent application Ser. Nos. 09/442,003 and No. 09/442,001.

The second of these applications (e.g., copending application Ser. No. 09/442,001) deals with prediction of resource exhaustion due to software aging effects, and teaches that resource exhaustion can be predicted using trend analysis on recently measured symptoms of the system being monitored. Specific trend analysis techniques used include linear regression, polynomial regression, and a modification of "Sen's slope estimate." These methods attempt to predict when a resource, or set of resources, approach a state in which resource exhaustion is imminent, and a software rejuvenation should be scheduled. However, copending application Ser. No. 09/442,001 does not teach how to select which trending method to use.

Furthermore, the suggested trending methods may not always be effective. For example, while polynomial regression may adequately fit the data observed in the recent past, it is not always a good predictor since polynomial values extrapolated into the future are not necessarily monotone. Further, such estimates are often unstable.

Thus, prior to the present invention, there has been no method of scheduling rejuvenation times by predicting resource exhaustion times from the best predictor, selected from a multitude of possible types of predictors (models). Further, while it is noted that similar notions are used in classical statistics to select the best model from amongst a set of possible models (see, e.g., Chapter 6 of *Applied Regression Analysis, Second Edition*, Norman Draper and Harry Smith, John Wiley & Sons, Inc., 1981), prior to the present invention, such approaches have not been used to predict software resource exhaustion times and to avoid disruptive software failures by scheduling rejuvenation times.

Moreover, the preferred types of predictors to consider, how to set their parameters, and how to choose between different predictors very much depends upon the software rejuvenation context. Indeed, the details of selecting appropriate classes of models, and appropriate penalty functions is not straightforward. Hence, no such easy consideration (let alone recognition of the problem) has been undertaken prior to the present invention.

SUMMARY OF THE INVENTION

In view of the foregoing and other problems, drawbacks, and disadvantages of the conventional methods and structures, an object of the present invention is to provide a method and structure having a prediction module for a software rejuvenation agent operating in a computing environment.

In a first aspect of the present invention, a method (and computer system where at least one software component thereof is restarted based on projection of resource exhaustion), for selecting the most suitable projection method from among a class of projection methods, includes providing M fitting modules which take measured symptom data associated with the system as input and produce M scores, wherein M is an integer, selecting the fitting module producing the best score, and from the selected module, producing a prediction of the resource exhaustion time.

Thus, the inventive prediction module increases system availability by avoiding disruptive system crashes by scheduling software rejuvenations at times prior to estimated resource exhaustion, and avoiding unnecessary rejuvenations caused by poor prediction of resource exhaustion times.

In the invention, multiple fitting modules are run against a recently collected symptom time series data sets from the system being monitored (These are called "symptom parameters" in copending application Ser. No. 09/442,001). Examples of measured symptoms that can be monitored in the exemplary application include memory usage, number of processes, etc. Such symptoms depend on, for example, the operating system, the applications being run, etc. Obviously, as would be known by one of ordinary skill in the art taking the present application as a whole, other symptoms may be measured, depending on the operating system.

Multiple measured symptoms can also be combined into a single, aggregate measured symptom. Associated with each fitting module is a score (or penalty) that measures how effectively the fitting module fits (describes) the collected data. The fitting module having the best score is selected as being the most reliable module for describing the behavior of the measured symptom.

Associated with each fitting module is a prediction module that predicts when the system will exhaust resources associated with the measured symptoms. The prediction module corresponding to the fitting module with the best score is selected as the most reliable predictor of resource exhaustion for that symptom.

These predictions (e.g., one for each measured symptom) are input to the software rejuvenation agent which then schedules rejuvenations based on the predictions, as well as other considerations (e.g., there may be rules stating that two simultaneous rejuvenations are not permitted, or rules preferring that rejuvenations be scheduled during "non-prime shifts", etc.).

Thus, the present invention improves upon previous approaches to scheduling rejuvenation times by predicting resource exhaustion times from the best predictor, selected from a multitude of possible types of predictors (models). Further, the invention optimizes and selects the preferred types of predictors to consider, how to set their parameters, and how to choose between different predictors very much depends upon the software rejuvenation context.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Referring now to the drawings, and more particularly to FIGS. 1–9, there are shown preferred embodiments of the method and structures according to the present invention.

PREFERRED EMBODIMENT

Figure 1:
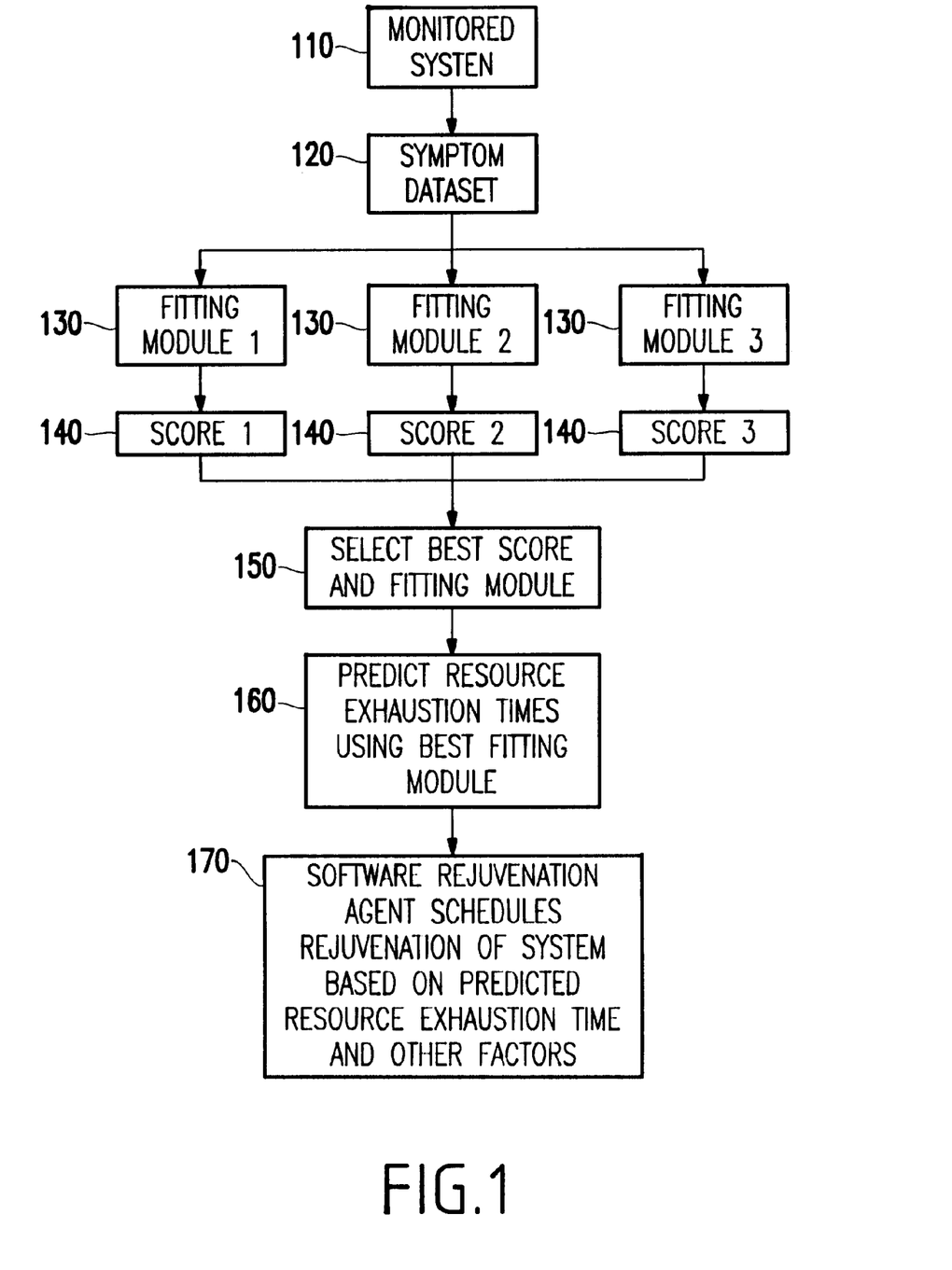
FIG. 1 depicts the overall process of using the fitting, prediction and rejuvenation scheduling method.

Referring to FIG. 1, the overall process of using the fitting, prediction and rejuvenation scheduling method 100 of the invention is shown.

In FIG. 1, there is a system 110 being monitored. From this system 110, a dataset 120 of recently measured symptom data is produced. There are M fitting modules 130 (e.g., FIG. 1 shows M=3) which take the measured symptom data as input and produce scores 140. The scores 140 are quantities which measure (indicate) how accurate a prediction is with a specific fitting module with specific data. For example, depending upon how the score is defined, a high score may indicate a high accuracy, whereas a low score may indicate a low accuracy of the fitting module taking the specific data (or alternatively a low score may indicate the best prediction accuracy).

Each fitting module may be different or may be the same. It is noted that different fitting modules may provide different predictions based on the different parameters being measured, and the different time frames in which the symptom data is gathered.

For example, considering predetermined symptom data (e.g., disk usage data) gathered at time T1, fitting module 1 may be the best fitting module (e.g., the fitting module having the highest score). Conversely, the same symptom data (e.g., disk usage data) gathered at time T2, fitting module 2 may be the best fitting module.

Thus, generally, the fitting modules are each considered good predictors, but some are better than others under different situations, since there is no single uniform best way of capturing the behavior of the data which is good for prediction. Different modules will capture different behavior(s) of the data. Hence, if the data behaves one way, then a first module is best for predicting, and likewise if the data behaves in another way, then a second module may be best for predicting. The invention provides a plurality of fitting modules which are very good predictors under certain assumptions, but it is unknown which fitting module the data (prediction) will follow. Hence, a plurality of modules are provided because the inventors recognize that under some conditions one module may be best and under other conditions another fitting module may be best. Thus, the selection of the best module depends upon the data and not the parameter.

Hence, the fitting module with the best score is selected in step 150. As mentioned above, the best score indicates that the prediction made by the specific fitting module is the most accurate. From the selected module, a prediction 160 of the resource exhaustion time is produced.

Then, a software rejuvenation agent 170 schedules a rejuvenation of the monitored system, based upon the predicted resource exhaustion times, as well as other factors such as the times of non-prime shifts, etc.

Figure 2:
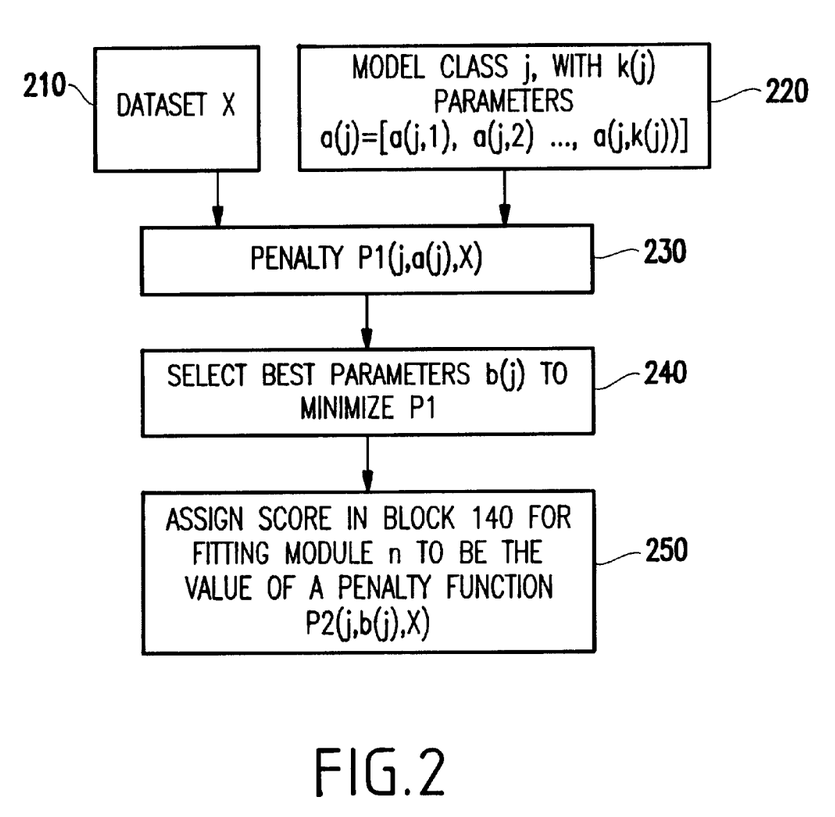
FIG. 2 shows a more detailed view of a fitting module.

FIG. 2 shows the operation of an exemplary fitting module 130 in more detail and the manner of performing the fitting of the data. In the case of FIG. 2, a minimizing of a sum of squares (e.g., a penalty function) is used to select the parameters.

Turning now to FIG. 2, there is a data set 210 of measured symptoms, which is denoted by X, which includes observations taken during a "window" (e.g., a time interval). For example, the time interval could be three days, and these observations could be taken at every hour during the three-day time period. That is, these observations may be taken at different times within the window and may measure one or several different aspects of the system, as mentioned above, such as virtual memory usage, disk usage, number of processes, etc. Obviously, other parameters can be examined, as would be known by one of ordinary skill in the art after reading the present application.

Fitting module number j is represented by a class of models 220. This class of models has k(j) parameters.

Let $a(j)=[a(j,1), \ldots, a(j,k(j))]$ denote the set of parameters for class j. For example, if $X=[M(t1), M(t2), \ldots, M(tk)]$ where M(t) represents memory usage at time t, then an example of a two parameter model is the linear regression model $M(t)=a(j,1)+a(j,2)t+error$.

Associated with parameters a(j) is a penalty function 230 P1,a(j), X), which measures the "goodness of fit" of the model (e.g., a sum of squares of residuals).

The best parameter values, b(j), for model class j, are selected in step 240 (namely, parameter values b(j) minimize P1(j,a(j),X) over all possible values of parameters a(j)). Typically, for computational efficiency, P1 is the Residual Sum of Squares (RSS).

$$P1(i,a,X)=[Z(1)-Y(1)]^2+\ldots+[Z(m)-Y(m)]^2,$$

where Z(i) is the fitted value at time t(i) and the notation x^c means x raised to the power c.

Optionally, there is a second penalty function P2(j,b(j),X) which may be different from P1, for deciding what the score should be for prediction. In particular, P2(j,b(j),X) might incorporate a penalty for the lack of fit of the model class j with parameters b(j) to the data, as well as a penalty for the complexity of the model.

For example, later data values may be given more weight or the model may be penalized if there are more parameters (as opposed to less) considered by the specific model. By the same token, "complexity" of the model may penalize the model such that, for example, if there are many parameters, then the error calculated in the prediction must be less than a certain threshold. For example, suppose a model has three parameters and it has some fitting error, and suppose another model has four parameters and has less of a fitting error (e.g., because of the extra parameter), the model with four parameters will be penalized unless it improves upon the fitting error by a certain percentage. Thus, even if the more complex model has a better accuracy, it is more complex to use. In other words, if one picks a model which is too simplistic, then it will not predict well, and if one picks a model which is too complex (many parameters), then it may fit well but not predict well (this is known as "overfitting"). The best model is one that is intermediate the simplistic model and the complex model.

Hence, "complexity" may be measured by the number of parameters considered, and then the model penalized accordingly.

Referring now also to FIG. 1, the score 250 associated with block 140 of Fitting Module j is assigned to be P2(j,b(j),X). With these scores, the best fitting module selected in step 150 is J, where J is the index that minimizes the penalty functions P2(1,b(1),X), . . . , P2(M,b(M),X).

Then, the model class selected is J, and the parameters selected for that model class are b(J). The resource exhaustion time predicted in step 160 is predicted from this overall best model (e.g., using model class J with parameters b(J)). This procedure may be applied to each measured symptom.

It is noted, that within the field of data analysis, similar techniques are used to select the "best" regression model (N. R. Draper and H. Smith, Applied Regression Analysis, 2nd ed., John Wiley & Sons, Inc., New York, 1981) or for selecting the "best" time series model (see for example, H. Bozdogan, "Model selection and Akaike's Information Criterion (AIC): The General Theory and Its Analytical Extensions," Psychometrika 53:3, 1987 pp. 345–370).

However, as alluded to above, the combination of such techniques with software rejuvenation to increase system availability is unique and novel to the present invention. Furthermore, the details of selecting appropriate classes of models, and appropriate penalty functions is not straightforward nor as provided by the present invention.

Figure 3:
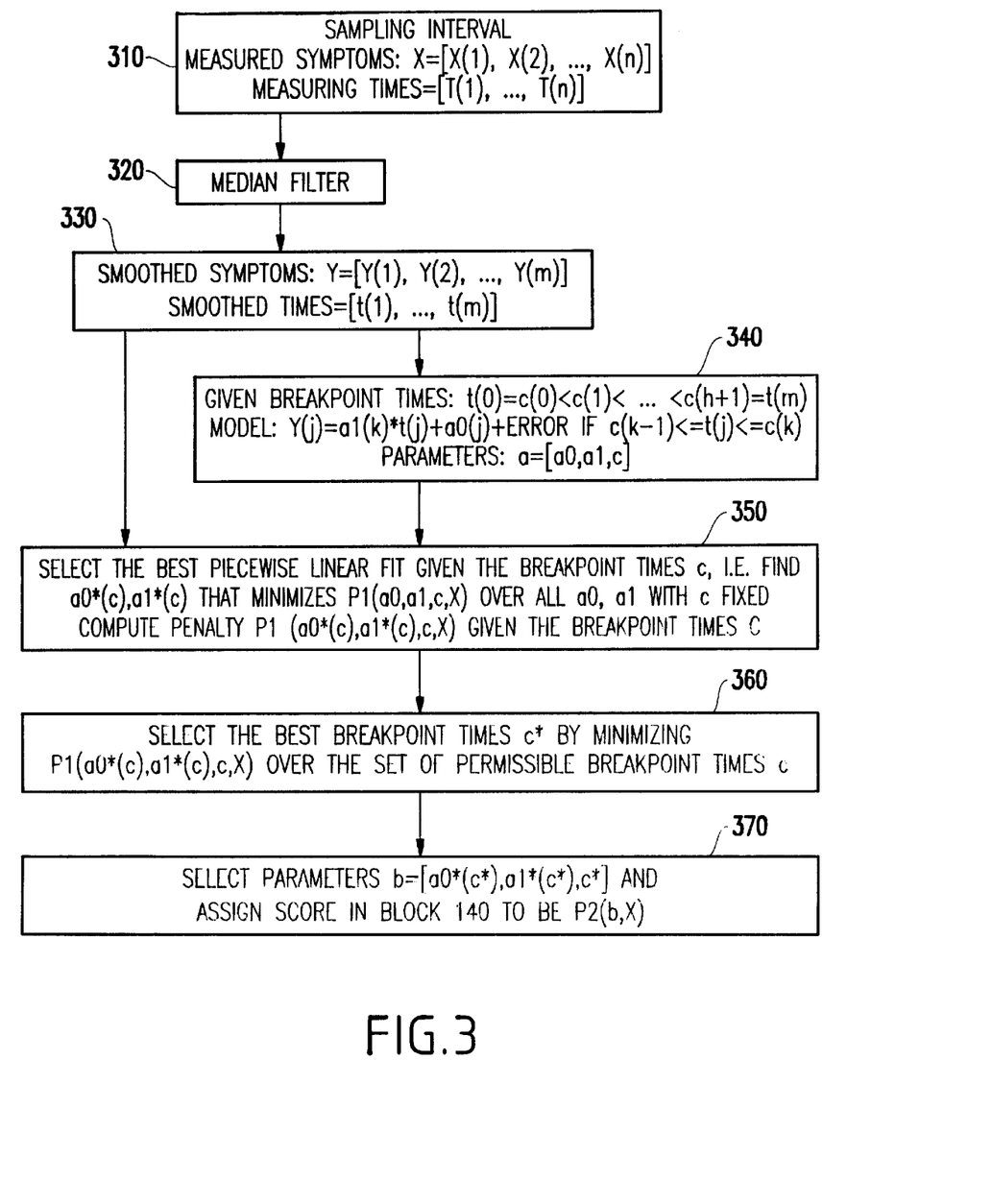
FIG. 3 shows a detailed view of a piecewise linear fitting module.
Figure 5:
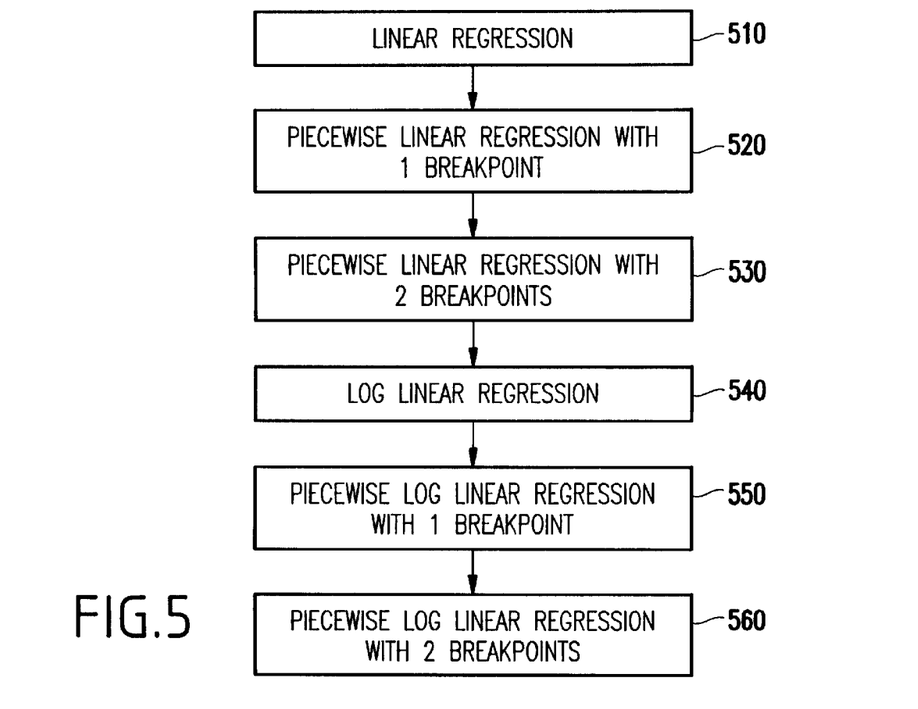
FIG. 5 depicts an exemplary set of fitting modules.

FIG. 3 illustrates a preferred embodiment of a fitting module in more detail. FIG. 3 corresponds to a piecewise linear fitting module. In piecewise linear fitting module, it can be considered that, for example, in performing a fitting between a time T0 to a time T10, a breakpoint is selected somewhere between T0 and T10 (e.g., T4), such that the model is linear between T0 and T4, and there is a different linear model between T4 and T10, but it is selected such that the different linear models line up at the breakpoint at time T4. As mentioned above, other fitting modules can be used as illustrated in FIG. 5 and as described below.

The module operates on a sliding window of data spanning a temporal interval. A symptom is measured at times T(1), . . . , T(N) during a recent time window 310. In particular, X(i) is the value of the measured symptom at time T(i).

To make the module more robust, this data is sent through a smoothing median filter 320 (e.g., which are well-known to those ordinarily skilled in the art) to produce a smoothed signal 330. If the median width is k, and n=m*k, then the output of the median filter is to produce m medians Y(1), . . . , Y(m) which is associated to "sampling times" t(1), . . . , t(m). In particular Y(1)=median (X(1), . . . , X(k)), Y(2)=median(X(k+1), . . . , X(2k)), etc. and the sampling times of the medians are defined as t(1)=median (T(1), . . . , T(k)) t(2)=median(T(k+1), . . . , T(2k)), etc.

For piecewise linear regression, h breakpoint times c(1), . . . , c(h) and p=3*h fitting parameters are chosen 340. The fitting module uses the model $$Y(j)=a1(k)*t(j)+a0(k)+\text{error if } c(k-1)<=t(j)<=c(k)$$

where c(0)=t(0) and c(k+1)=t(m). Additional constraints are imposed so as to make the fitted function continuous at the breakpoints. In particular, it is required that a1(k)*c(k) +a0(k)=a1(k+1)*c(k) +a0(k+1). The parameters are:

$$b=[a0(1), \ldots, a0(h), a1(1), \ldots, a1(h), c(1), \ldots, c(h)]=[a0,a1,c].$$

To keep the procedure computationally efficient and to prevent overfitting, the breakpoint times are constrained to occur at only a finite number of possible times during the window.

To find the best parameters b, as in 240 of FIG. 2, a two-stage procedure is used. First, the breakpoint times c are fixed at one of the possible sets of breakpoint times. Given c, the best values for a0 and a1, a0*(c) and a1*(c) are found by minimizing the Penalty P1(a0,a1,c,X) over a0 and a1 (e.g., using least squares minimization) in step 350.

Then, the best location for the breakpoints is found by finding that c* that minimizes P1(a0*(c),a1*(c),c,X) over the set of all possible breakpoints c in step 360. The best parameters for piecewise linear regression with h breakpoints are then set to $$b=[a0*(c*),a1*(c*),c*]$$

and the score for block 140 is set to P2(b,X)=P2(a0*(c*), a1*(c*),c*,X) in step 370.

A significant problem with such fitting procedures is "overfitting" the data which can occur if a model has too many parameters, if there are too many model types (M) or, in piecewise linear regression, if there are too many breakpoints. Also, predictions become unreliable if the breakpoints are allowed to be placed too closely together and in particular if they are allowed to be placed too close to the end of the fitting window. It is noted that being "too close" is a subjective term based on, for example, the application involved. Indeed, having the points spread out (and having more points to smooth over) results in a more stable estimate. To protect against overfitting, a number of steps are taken.

First, the number of breakpoints is limited by a constant B (e.g., say B=10) and the positions of the breakpoints are uniformly spread over the fitting window. In addition, the largest B0 (e.g., say B0=2) of the breakpoints are not permitted to be used. This prevents having breakpoints too close to the end of the fitting window.

Second, different penalty functions are used to select the best parameters for a module (P1) and to determine which fitting module is "best" (P2). The function P2 also incorporates a penalty for the number of fitting parameters used.

Figure 4:
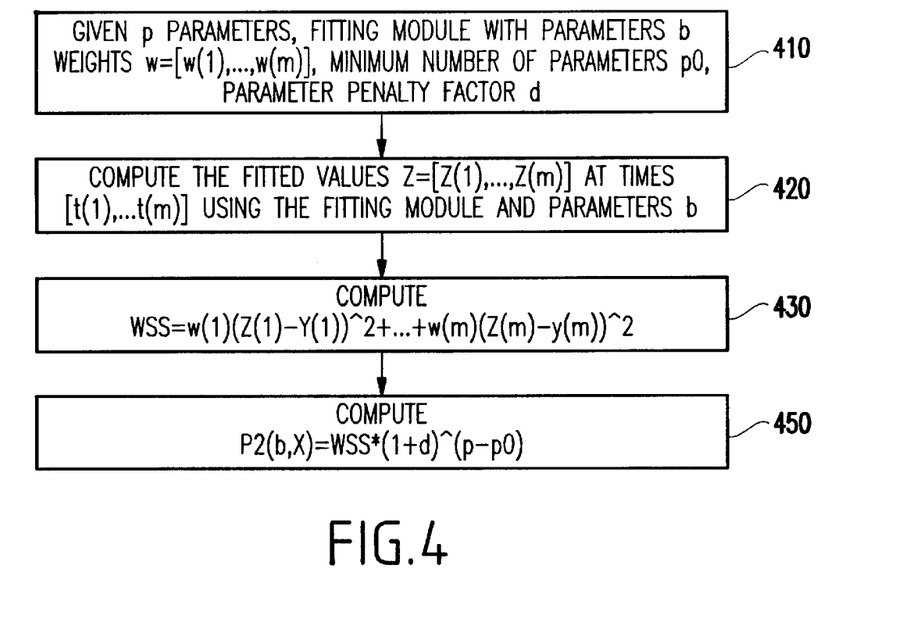
FIG. 4 depicts an example of score functions used to select the best model.

Referring to FIG. 4, if a module has p parameters, then P2 is computed using weights w=[w(1), . . . , w(m)] and a parameter penalty d (e.g., step 410).

In step 420, the fitted values Z=[Z(1), . . . , Z(m)] using the fitting module with the parameters b at the times [t(1), . . . , t(m)] are computed. The Weighted Residual Sum of Squares WSS is computed in step 430 as:

$$WSS=w(1)(Z(1)-Y(1))^2+\ldots +w(m)(Z(m)-y(m))^2.$$

By selecting w so as to give less weight to those fitted values further in the past, the method places greater emphasis on recent data. For example, for a number r, 0<r<1, the weighting function $w(i)=r^{(m-i)}$ gives the most weight to the most recent observations. When selecting parameters using piecewise linear regression, the parameters b are selected using the Residual Sum of Squares RSS which is a special case of WSS in which w(i)=1 for all i. The RSS weights errors equally no matter where they occur in the fitting window. Since by adding more parameters, the RSS can be reduced to zero, a penalty is included for the number of parameters used. In particular, step 440 uses $$P2(b,X)=Wp=WSS*(1+d)\hat{}(p-p0)$$

where p is the number of parameters used in the fitting module and p0 is the minimum number of parameters used by any of the fitting modules. For example, if d=0.10, then a model with an extra parameter is only selected if it reduces the WSS by at least 10%. An alternate embodiment uses Mallows' Cp method (see, e.g., Chapter 6 of *Applied Regression Analysis, Second Edition*, Norman Draper and Harry Smith, John Wiley & Sons, Inc., 1981)

$$P2(b,X)=Cp=RSS/s\hat{}2-(m-2p)$$

where p is the number of parameters in the model, S^2 is the residual mean square error (RSS/m) from the largest model considered, and m is the number of samples in the smoothed signal. The model with the smallest value of Cp is then selected.

Third, the number of fitting modules M is limited and the types of modules used are selected so as to permit flexibility.

FIG. 5 displays the types of fitting modules used in a preferred embodiment which include Linear Regression 510, Piecewise Linear Regression with 1 breakpoint 520, Piecewise Linear Regression with 2 breakpoints 530, Log Linear Regression 540, Piecewise Log Linear Regression with 1 breakpoint 550, and Piecewise Log Linear Regression with 2 breakpoints 560. Hence, preferably a plurality of such fitting modules are used.

In Log Linear Regression, the assumption is that the logarithm of the symptom is described by a linear function: log(Y(t(j)))=a1(k)*t(j)+a0(k). Log Linear and Piecewise Log Linear Regression can only be used if the symptom data are positive (e.g., as opposed to having negative values). Indeed, as known, taking the logarithm of a negative number is undefined. Thus, to fit a logarithmic model, it must be on non-negative data. Those skilled in the art can appreciate that different types of fitting modules may also be used such as, for example, those that model periodic behavior.

Once a fitting module is selected, it is used to predict when a resource will become exhausted.

Figure 6:
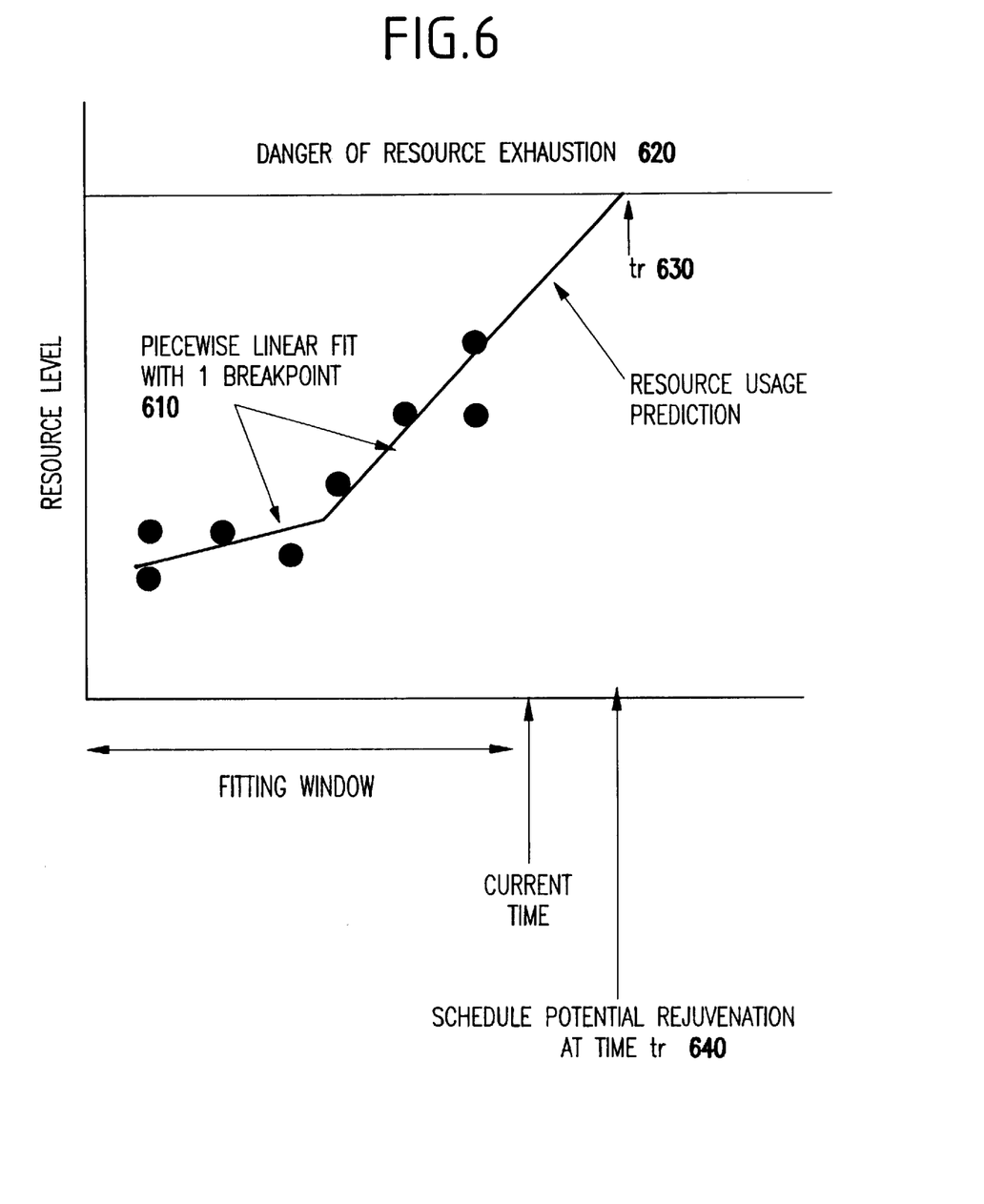
FIG. 6 depicts the fitting window and a prediction of the resource exhaustion time.

Referring to FIG. 6, suppose that the fitting module selected is Piecewise Linear Regression with 1 breakpoint (e.g., fitting model 520 in FIG. 5; shown at reference numeral 610 in the plot of FIG. 6) and that when a resource approaches a danger level 620, the system should be rejuvenated. The time tr at which the resource is estimated to become exhausted is determined by extrapolating the piecewise linear fit into the future and seeing where it reaches the danger level (if ever) 630. A potential rejuvenation is scheduled for time tr 640.

Whether or not an actual rejuvenation occurs at time tr 640 depends on many factors. For example, because a different resource may become exhausted first, a rejuvenation may occur before time tr 640. Techniques in the above-noted copending applications may be used to select actual rejuvenation times, based upon the predictions.

It is noted that the exemplary graph of FIG. 6 show the actual data points observed and collected, and the curves selected represent the best module (e.g., the Linear Piecewise with 1 Breakpoint fitting module). That is, the Linear Piecewise with 1 Breakpoint fitting module represents the curve which fits the data the best. In other words, another fitting module (e.g., Linear Piecewise Regression by itself without a breakpoint) would have a worse fit. By the same token, if another fitting module had a better fit, then it would be selected.

Thereafter, as shown in FIG. 6, the curve is extrapolated out to some future time, and the rejuvenation is scheduled at a time prior to resource exhaustion.

Figure 7:
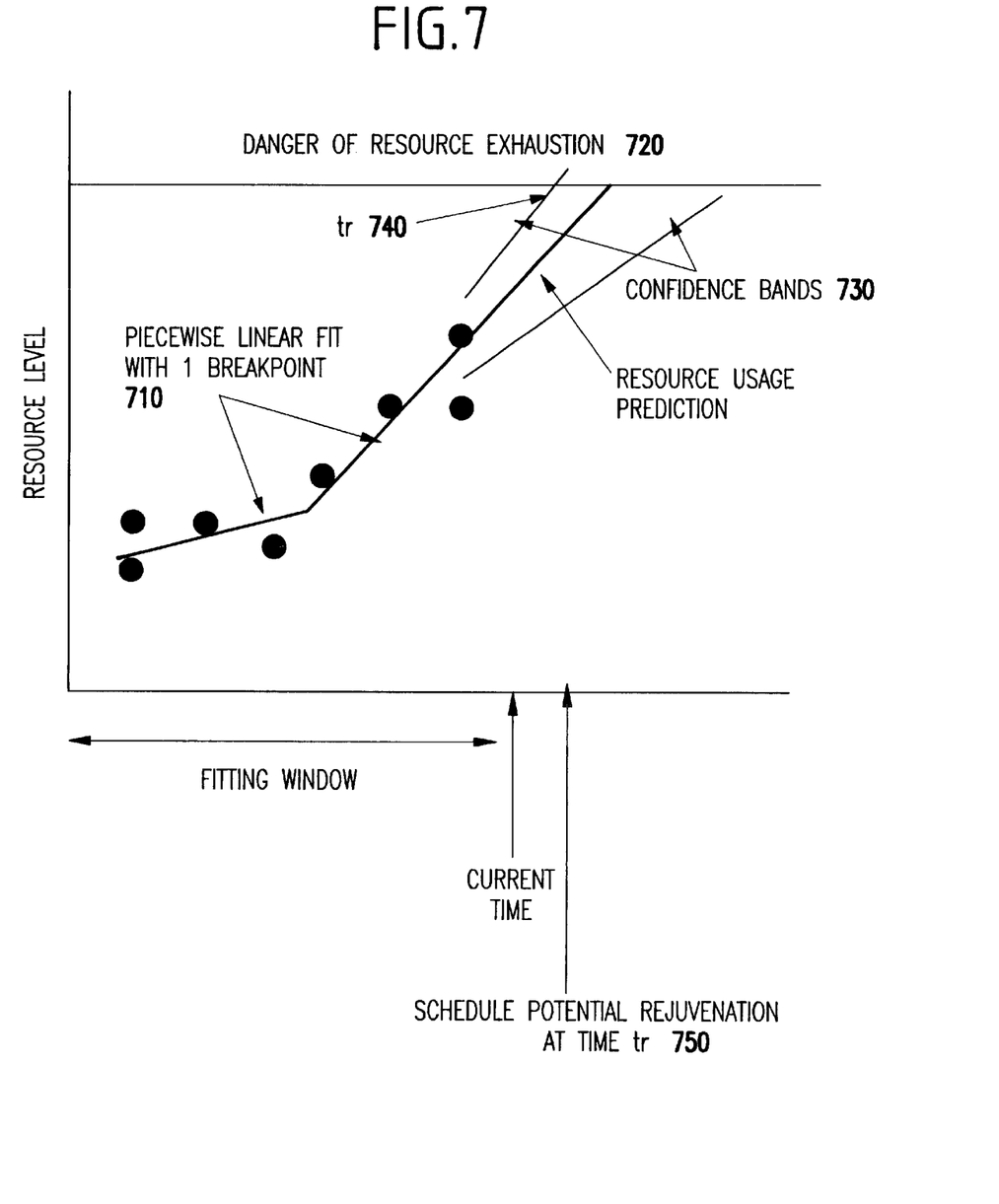
FIG. 7 depicts the fitting window and a prediction of the resource exhaustion time, taking into account uncertainties in the projection's accuracy via the use of confidence intervals.

Turning now to FIG. 7, often in least squares fitting, approximate confidence intervals for the fitted parameters can be estimated. Such confidence intervals may be used to construct a confidence band for the extrapolated prediction.

For example, referring to FIG. 7, the potential rejuvenation time tr 740 is determined when the confidence band 730 first reaches the danger level 720. A potential rejuvenation is scheduled for time tr 750.

It is noted that the confidence bands shown in FIG. 7 are specific to the fitting module selected (e.g., piecewise linear regression with 1 breakpoint). Hence, other confidence bands would be selected if a different fitting module is selected. As known by one of ordinary skill in the art, the providing of confidence bands takes a conservative approach in extrapolation of data in that the further one predicts out in the future (e.g., from a last data point), the less confident one becomes in the prediction. That is, the confidence bands become wider the further prediction goes out. Thus, the rejuvenation is scheduled when the confidence bands reach the exhaustion level.

Figures 8, 9:
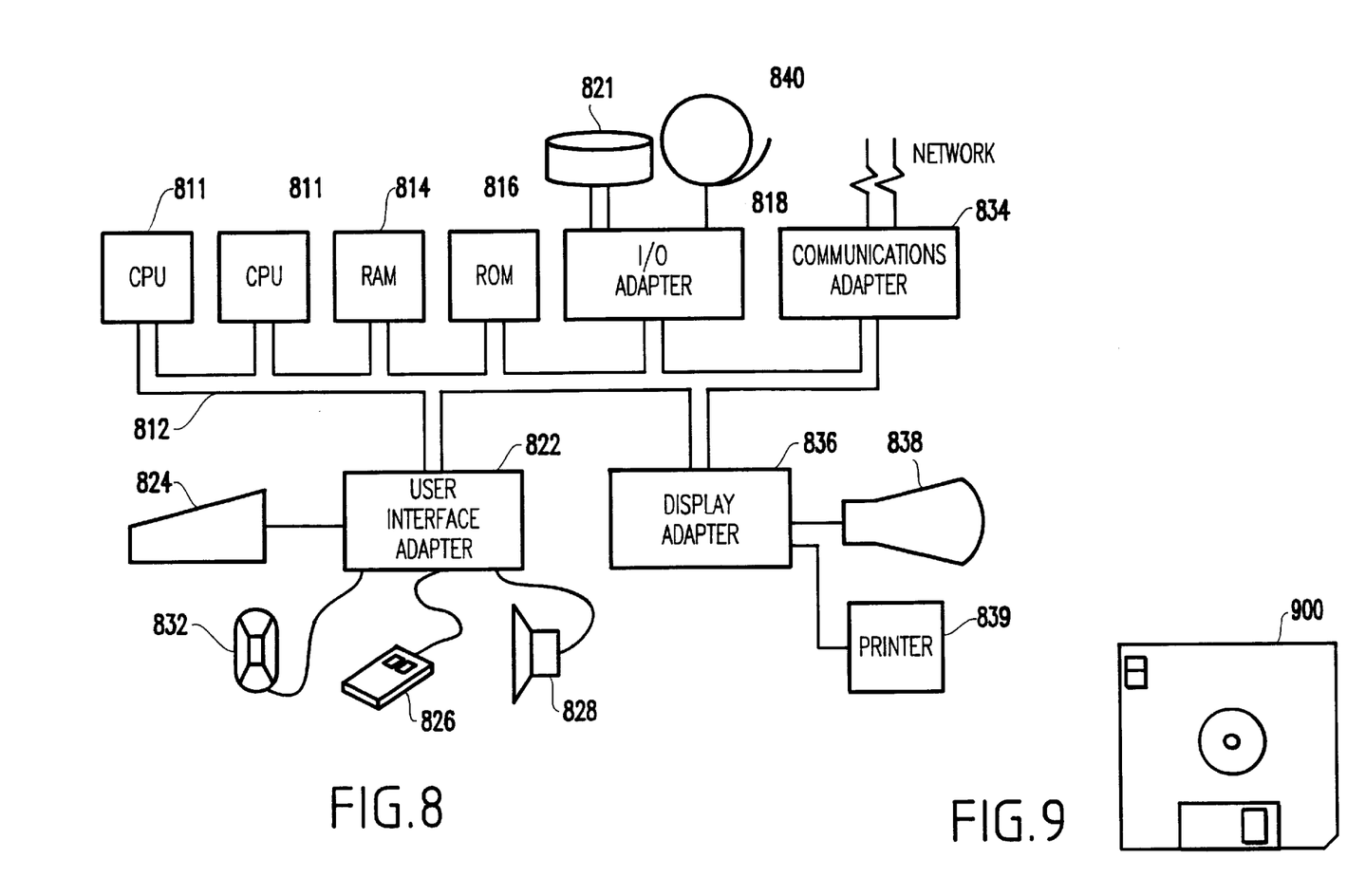
FIG. 8 illustrates an exemplary hardware/information handling system 800 for incorporating the present invention therein.
FIG. 9 illustrates a signal bearing medium (e.g., storage medium) 900 for storing steps of a program for software rejuvenation according to the present invention.

FIG. 8 illustrates a typical hardware configuration of an information handling/computer system which can be used with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839.

In addition to the hardware/software environment described above, a different aspect of the invention includes a computer-implemented method for performing the above method. As an example, this method may be implemented in the particular environment discussed above.

Thus, as shown in FIG. 9 in addition to the hardware and process environment described above, a different aspect of the invention includes a computer-implemented method according to the present invention, as described above. As an example, this method may be implemented in the particular hardware environment discussed above.

Such a method may be implemented, for example, by operating the CPU 811 (FIG. 8), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, in the exemplary application, the present invention increases system availability by avoiding disruptive system crashes by scheduling software rejuvenations at times prior to estimated resource exhaustion, and avoiding unnecessary rejuvenations caused by poor prediction of resource exhaustion times.

While the invention has been described in terms of several preferred embodiments, those skilled in the art will recognize that the invention can be practiced with modification within the spirit and scope of the appended claims.

What is claimed is:

1. In a computer system where at least one software component thereof is restarted based on projection of resource exhaustion, a method for selecting the most suitable projection method from among a class of projection methods, comprising:

providing M fitting modules which take measured symptom data associated with said system as input and produce M scores, wherein M is an integer;

selecting the fitting module producing the best score; and from the selected module, producing a prediction of the resource exhaustion time.

2. The method of claim 1, further comprising:

monitoring a system; and producing a dataset of recently measured symptom data of said system.

3. The method of claim 1, further comprising:

scheduling a rejuvenation of the monitored system, based upon the predicted resource exhaustion time.

4. The method of claim 3, wherein said scheduling further considers another factor including a time of a non-prime shift of said computer system.

5. The method of claim 1, further comprising:

creating a data set of measured symptoms, denoted by X, which includes observations taken during a time interval, wherein observations are taken at different times within the time interval and measure at least one aspect of the system, including any of a virtual memory usage, a disk usage, and a number of processes;

representing a fitting module number j by a class of models having k(j) parameters;

letting a(j)=[a(j,1), . . . , a(j,k(j))] denote a set of parameters for class j, calculating a penalty function P1(j,a(j), X), which measures a goodness of fit of the fitting model; and selecting best parameter values, b(j) for model class j, such that said best parameter values b(j) minimize P1(j,a(j),X) over all possible values of the parameters a(j).

6. The method of claim 5, further comprising:

calculating a second penalty function P2(j,b(j),X) which incorporates any of a penalty for the lack of fit of the model class j with parameter values b(j) to the data and a penalty for complexity of the model.

7. The method of claim 1, further comprising:

associating, with each fitting module j, a score and assigning the score to be P2(j,b(j),X), such that with the plurality of scores, the best fitting module J is selected, where J is the index that minimizes penalty functions P2(1,b(1),X), . . . , P2(M,b(M),X).

8. The method of claim 7, further comprising:

selecting a model class J, wherein the parameter values selected for that model class are b(J).

9. The method of claim 8, further comprising:

predicting the resource exhaustion time from the best fitting model using model class J with parameter values b(J), wherein said selecting and predicting is applied to each measured symptom.

10. The method of claim 1, wherein said selecting a fitting module comprises:

measuring a symptom at times T(1), . . . , T(N) during a time window, where X(i) is a data value of a measured symptom at time T(i);

smoothing, with a smoothing filter, data values to produce a smoothed signal, wherein if the median width is k, and n=m*k, then the output of the filter is to produce m medians Y(1), . . . , Y(m) which is associated to sampling times' t(1), . . . , t(m) such that Y(1)=median (X(1), . . . , X(k)), Y(2)=median(X(k+1), . . . , X(2k)), . . . and the sampling times of the medians are defined as t(1)=median (T(1), . . . , T(k)), t(2)=median(T(k+1), . . . T(2k)), . . . ; and selecting h breakpoint times c(1), . . . , c(h), wherein the fitting module uses the model $$Y(j)=a1(k)*t(j)+a0(k)+\text{error if } c(k-1)<=t(j)<=c(k)$$

where c(0)=t(0) and c(k+1)=t(m).

11. The method of claim 10, wherein said selecting a fitting module further comprises:

imposing an additional constraint so as to make the fitted function continuous at the breakpoints such that a1(k) *c(k)+a0(k)=a1(k+1)*c(k)+a0(k+1), wherein the parameters are:

$$a=[a0(1), \ldots, a0(h), a1(1), \ldots, a1(h), c(1), \ldots, c(h)]=[a0,a1, c].$$

12. The method of claim 11, wherein said selecting a fitting module further comprises:

finding the best parameter values b, said finding the best parameter values including:

fixing breakpoint times c at one of a possible sets of breakpoint times such that given c, the best values for a0 and a1, a0*(c) and a1*(c) are found by minimizing the Penalty P1(a0,a1,c,X) over a0 and a1;

finding a best location for the breakpoints by finding that c* that minimizes P1(a0*(c),a1*(c),c,X) over the set of all possible breakpoints c; and setting the best parameter values with h breakpoints to:

$$b=[a0*(c*),a1*(c*),c*]$$

and setting the score to P2(b,X)=P2(a0*(c*),a1*(c*),c*,X).

13. The method of claim 12, wherein said selecting a fitting module further comprises:

preventing overfitting of said data.

14. The method of claim 13, wherein said preventing includes:

with a fitting module having p parameters, computing a penalty P2 using weights w=[w(1), . . . , w(m)] and a parameter penalty d; and computing fitted values Z=[Z(1), . . . , Z(m)] using the fitting module with the parameter values b at times [t(1), . . . , t(m)], wherein weighted residual sum of squares (WSS) is computed as:

$$WSS=w(1)(Z(1)-Y(1))^2+\ldots+w(m)(Z(m)-y(m))^2$$

such that w is selected so as to give less weight to those fitted values further in the past.

15. The method of claim 14, wherein a penalty is included for the number of parameters used such that one of:

$$P2(b,X)=Wp=WSS^*(1+d)^{(p-p0)}$$

where p is the number of parameters used in the fitting module and p0 is the minimum number of parameters used by any of the fitting modules, and $$P2(b,X)=Cp=RSS/s^2-(m-2p)$$

is used, where p is the number of parameters in the model, $s^2$ is the residual mean square error (RSS/m) from the largest model considered, and m is the number of samples in the smoothed signal, wherein the fitting model with a smallest value of Cp is selected.

16. The method of claim 1, wherein said fitting modules include any of a Linear Regression Module, a Piecewise Linear Regression Module with 1 breakpoint, a Piecewise Linear Regression Module with at least 2 breakpoints, a Log Linear Regression Module, a Piecewise Log Linear Regression Module with 1 breakpoint, and a Piecewise Log Linear Regression Module with at least 2 breakpoints.

17. The method of claim 1, wherein, when a resource approaches a danger level, the computer system should be rejuvenated, and
wherein a time tr at which the resource is estimated to become exhausted is determined by extrapolating the best fitting module into the future and detecting where the danger level is reached, such that a potential rejuvenation is scheduled for a time just prior to tr.

18. The method of claim 1, further comprising:
estimating approximate confidence intervals for fitted parameters; and
constructing, based on said confidence intervals, a confidence band for an extrapolated prediction.

19. The method of claim 18, wherein a potential rejuvenation time of said system is determined when the confidence band first reaches a danger level, and a potential rejuvenation is scheduled for said potential rejuvenation time.

20. The method of claim 1, wherein said at least one software component includes an operating system of said computer system.

21. A computer system where at least one software component thereof is restarted based on projection of resource exhaustion, comprising:
a selector for selecting a most suitable projection method from among a class of projection methods.

22. The system of claim 21, wherein said selector comprises:
a plurality of M fitting modules which take measured symptom data associated with said system as input and produce M scores, wherein M is an integer; and
a selecting unit for selecting the fitting module producing the best score.

23. The system of claim 22, wherein said selector further comprises:
a predictor for producing a prediction of the resource exhaustion time, based on the module selected by said selecting unit.

24. The system of claim 21, wherein said at least one software component includes an operating system of said computer system.

25. The system of claim 23, further comprising:
a monitor for monitoring the system, said monitor producing a dataset of recently measured symptom data of said system.

26. The system of claim 23, further comprising:
a scheduler for scheduling a rejuvenation of the monitored system, based upon the predicted resource exhaustion time.

27. The system of claim 26, wherein said scheduler further considers another factor including a time of a non-prime shift of said computer system.

28. The system of claim 23, further comprising:
means for creating a data set of measured symptoms, denoted by X, which includes observations taken during a time interval,
wherein observations are taken at different times within the time interval and measure at least one aspect of the system, including any of a virtual memory usage, a disk usage, and a number of processes;
means for representing a fitting module number j by a class of models having k(j) parameters;
letting a(j)=[a(j,1), . . . , a(j,k(j))] denote a set of parameters for class j, a calculator for calculating a penalty function P1(j,a(j), X), which measures a goodness of fit of the fitting model; and
means for selecting best parameter values, b(j) for model class j, such that said best parameter values b(j) minimize P1(j,a(j),X) over all possible values of the parameters a(j).

29. The system of claim 28, further comprising:
means for calculating a second penalty function P2(j,b(j), X) which incorporates any of a penalty for the lack of fit of the model class j with parameter values b(j) to the data and a penalty for complexity of the model.

30. The system of claim 23, further comprising:
means for associating, with each fitting module j, a score and assigning the score to be P2(j,b(j),X), such that with the plurality of scores, the best fitting module J is selected, where J is the index that minimizes penalty functions P2(1,b(1),X), . . . , P2(M,b(M),X).

31. The system of claim 30, further comprising:
means for selecting a model class J, wherein the parameter values selected for that model class are b(J).

32. The system of claim 31, wherein said predictor predicts the resource exhaustion time from the best fitting model using model class J with parameter values b(J),
wherein said selecting and predicting is applied to each measured symptom.

33. The system of claim 23, wherein said selector for selecting a fitting module comprises:
means for measuring a symptom at times T(1), . . . , T(N) during a time window, where X(i) is a data value of a measured symptom at time T(i);
a smoothing filter for smoothing data values to produce a smoothed signal, wherein if the filter width is k, and n=m*k, then the output of the filter is to produce m medians Y(1), . . . , Y(m) which is associated to sampling times' t(1), . . . , t(m) such that Y(1)=median (X(1), . . . , X(k)), Y(2)=median(X(k+1), . . . , X(2k)), . . . and the sampling times of the medians are defined as t(1)=median (T(1), . . . , T(k)), t(2)=median(T(k+1), . . . , T(2k)), . . . ; and means for selecting h breakpoint times c(1), . . . , c(h), wherein the fitting module uses the model $$Y(j)=a1(k)*t(j)+a0(k)+\text{error if } c(k-1)<=t(j)<=c(k)$$

where c(0)=t(0) and c(k+1)=t(m).

34. The system of claim 33, wherein said selector for selecting a fitting module further comprises:

means for imposing an additional constraint so as to make the fitted function continuous at the breakpoints such that a1(k)*c(k)+a0(k)=a1(k+1)*c(k)+a0(k+1), wherein the parameters are:

$$a=[a0(1), \ldots, a0(h), a1(1), \ldots, a1(h), c(1), \ldots, c(h)]=[a0,a1,c].$$

35. The system of claim 34, wherein said selector for selecting a fitting module further comprises:

means for finding the best parameter values b, said finding the best parameter values including:

means for fixing breakpoint times c at one of a possible sets of breakpoint times such that given c, the best values for a0 and a1, a0*(c) and a1*(c) are found by minimizing the Penalty P1(a0,a1,c,X) over a0 and a1;

means for finding a best location for the breakpoints by finding that c* that minimizes P1(a0*(c),a1*(c),c,X) over the set of all possible breakpoints c; and means for setting the best parameter values with h breakpoints to:

$$b=[a0*(c*),a1*(c*),c*]$$

and setting the score to P2(b,X)=P2(a0*(c*),a1*(c*),c*,X).

36. The system of claim 35, wherein said selector for selecting a fitting module further comprises:

means for preventing overfitting of said data.

37. The system of claim 36, wherein said means for preventing includes:

means for computing, with a fitting module having p parameters, a penalty P2 using weights w =[w(1), . . . , w(m)] and a parameter penalty d; and means for computing fitted values Z=[Z(1), . . . , Z(m)] using the fitting module with the parameter values b at times [t(1), . . . , t(m)], wherein weighted residual sum of squares (WSS) is computed as:

$$WSS=w(1)(Z(1)-Y(1))^2+\ldots +w(m)(Z(m)-y(m))^2$$

such that w is selected so as to give less weight to those fitted values further in the past.

38. The system of claim 37, wherein a penalty is included for the number of parameters used such that one of:

$$P2(b,X)=Wp=WSS*(1+d)^{(p-p0)}$$

where p is the number of parameters used in the fitting module and p0 is the minimum number of parameters used by any of the fitting modules, and $$P2(b,X)=Cp=RSS/s^2-(m-2p)$$

is used, where p is the number of parameters in the model, $s^2$ is the residual mean square error (RSS/m) from the largest model considered, and m is the number of samples in the smoothed signal, wherein the fitting model with a smallest value of Cp is selected.

39. The system of claim 22, wherein said fitting modules include any of a Linear Regression Module, a Piecewise Linear Regression Module with 1 breakpoint, a Piecewise Linear Regression Module with at least 2 breakpoints, a Log Linear Regression Module, a Piecewise Log Linear Regression Module with 1 breakpoint, and a Piecewise Log Linear Regression Module with at least 2 breakpoints.

40. The system of claim 22, wherein, when a resource approaches a danger level, the computer system should be rejuvenated, and wherein a time tr at which the resource is estimated to become exhausted is determined by extrapolating the best fitting module into the future and detecting where the danger level is reached, such that a potential rejuvenation is scheduled for a time just prior to tr.

41. The system of claim 22, further comprising:

an estimator for estimating approximate confidence intervals for fitted parameters; and means for constructing, based on said confidence intervals, a confidence band for an extrapolated prediction.

42. The system of claim 41, wherein a potential rejuvenation time of said system is determined when the confidence band first reaches a danger level, and a potential rejuvenation is scheduled for said potential rejuvenation time.

43. The system of claim 21, wherein said selector comprises:

a plurality of M fitting modules which take symptom data associated with said system as input and produce M scores, wherein M is an integer and wherein said selector selects one of said fitting modules based on said scores produced.

44. The system of claim 21, wherein said selector comprises:

a selecting unit for selecting, from a plurality of fitting modules which take data associated with said system and produce a plurality of scores, a fitting module producing the best score.

45. A signal-bearing medium tangibly embodying a program of machine-readable instructions executable by a digital processing apparatus to perform a method for, in a computer system where at least one software component thereof is restarted based on projection of resource exhaustion, selecting the most suitable projection method from among a class of projection methods, said method comprising:

providing M fitting modules which take measured symptom data associated with said system as input and produce M scores, wherein M is an integer;

selecting the fitting module producing the best score; and from the selected module, producing a prediction of the resource exhaustion time.

* * * * *